Jan. 15, 1963
R. D. MAY
3,073,337
PRESSURE EQUALIZING VALVE MECHANISM
Filed Sept. 15, 1959
2 Sheets-Sheet 1
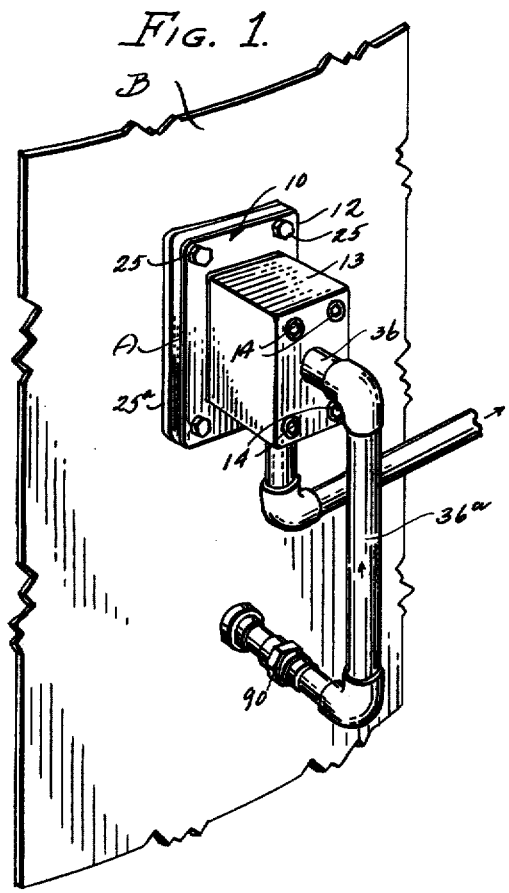
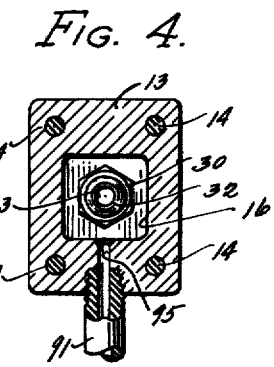
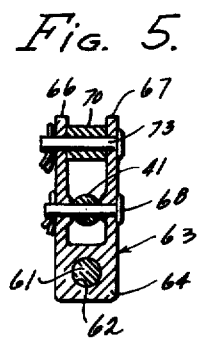
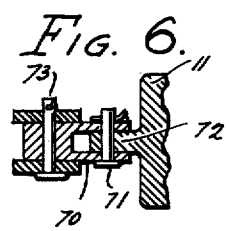
INVENTOR
RUSSELL D. MAY
BY
ATTORNEYS

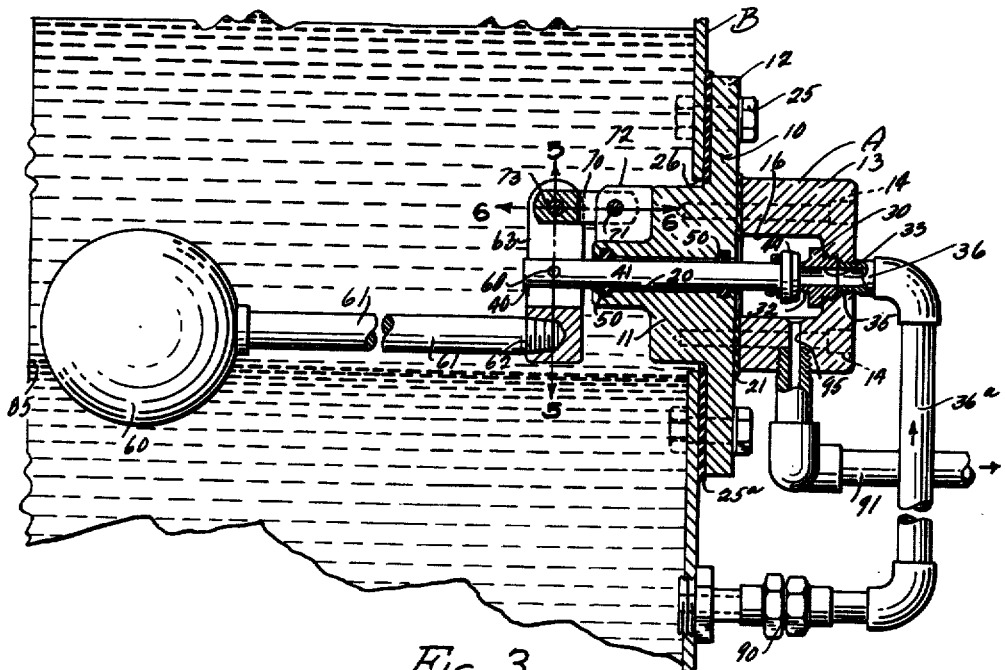
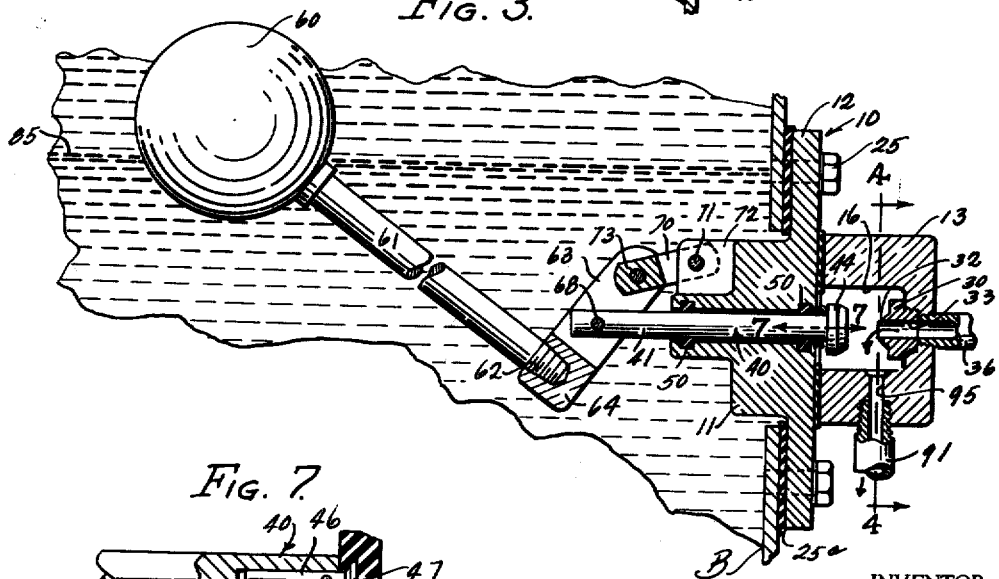
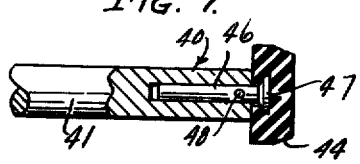

United States Patent Office 3,073,337
Patented Jan. 15, 1963

3,073,337
PRESSURE EQUALIZING VALVE MECHANISM
Russell D. May, Tulsa, Okla., assignor to The Youngstown Sheet and Tube Company, Youngstown, Ohio, a corporation of Ohio
Filed Sept. 15, 1959, Ser. No. 840,123
5 Claims. (Cl. 137—398)

This invention relates to improvements in valve mechanisms adapted to be used upon tanks having gases and liquids therein under superatmospheric pressure and from which it is desired to release a fluid constituent; improved means being provided for equalizing the external pressure against the valve with tank pressure in order to permit the valve to open at the time it is desired to release a fluid constituent.

The primary object of this invention is the provision of a valve mechanism which may be used upon tanks containing fluids under superatmospheric pressure and which valve mechanism is adapted to operate a master valve through release of a fluid constituent therefrom; improved pressure equalizing means being provided to enable the valve to operate against the tank pressure acting thereon.

Other objects and advantages of this invention will be apparent during the course of the following detailed description.

In the accompanying drawings, forming a part of this specification, and wherein similar reference characters designate corresponding parts throughout the several views:

FIGURE 1 is a perspective view showing a part or section of the wall of a tank or receptacle upon which the improved valve is mounted.

FIGURE 2 is a vertical cross sectional view taken through the valve mechanism, showing the same attached to a tank with the valve closed by means of a float mechanism which operates at an interface between oil and water in the tank.

FIGURE 3 is a view of the details shown in FIGURE 2, but showing the float operating at the interface after the water level has risen to a predetermined extent in order to release the water and its pressure against the valve for pressure equalizing purposes, and from whence the water passes on for activating some other mechanism such as a master valve.

FIGURE 4 is a vertical cross sectional view taken substantially on the line 4—4 of FIGURE 3.

FIGURES 5 and 6 are cross sectional views taken substantially on their respective lines 5—5 and 6—6 shown in FIGURE 2 of the drawings.

FIGURE 7 is an enlarged fragmentary cross sectional view taken through the valve stem and head substantially on the line 7—7 shown in FIGURE 3.

In the accompanying drawings, wherein for the purpose of illustration is shown only a preferred embodiment of the invention, the letter A may generally designate the improved valve adapted for use upon a tank B adapted to contain fluids such as air, gases, oil and water or any other liquids.

The valve A is adapted to be used for the purposes specified upon tanks B which are adapted to contain fluids under superatmospheric pressure ranging from 200 to 800 pounds, although these pressure limitations are not critical.

The valve A preferably comprises a base 10 consisting of a cylindrical body portion 11 which has an outwardly extending attaching flange 12 which may be polygonal or circular. The valve furthermore includes a hollow cap 13 adapted to be attached by means of bolts 14 to the body 11; the cap 13 having an inner chamber 16 which opens against the body 11; the latter being provided with a valve stem slide passageway 20 therein communicating with the chamber 16. A gasket 21 is provided to normally seal the cap 13 against the body 11, as shown. The flange 12 is adapted to be attached to the tank B against a gasket 25ª by detachable bolts 25 of any desired number, and the tank B is provided with an opening 26 therein to receive the cylindrical body 11 therethrough.

It will be noted from the foregoing that the cap 13 is entirely detachable in order to have access to the valve and valve seat. A valve seat 30 is detachably screw threaded to an inner tapped opening provided in the front wall of the cap 13. It has a tapered flange seat 32 and has an orifice 33 therethrough of a predetermined diameter. The front wall of the cap 13 is of course apertured and preferably tapped at 35 for detachable connection of a pipe 36 which may be termed the pressure equalizing pipe and which is the outflow line for release of water or other liquid or fluid from the tank B in accordance with a description of the operation to be hereinafter set forth.

The valve proper designated generally at 40 in the drawing includes a stainless steel stem 41 which is slidable through the passageway 20; its inner end extending into the chamber of the tank B and its outer end extending into the chamber 16 of the valve cap 13 and there being provided with a valve head or disc 44, preferably of "neoprene," which may be held in place by means of a stem 46 having a flanged head 47 into which the valve disc 44 may be socketed; the stem 41 being provided with a passageway to receive the pin 46 which is held in place by a cotter pin 48.

The valve stem 41 has a sealed slidable seating in the passageway 20, preferably by means of O type sealing rings 50; the diameter of the stem 41 being such that there can be some degree of tilting or lateral play of the valve stem in the passageway 20, without release of liquid or the contents from the tank B along the valve stem.

The valve 40 is actuated by means of a float arrangement consisting of a delicately weighted float sphere 60 having a float rod 61 connected thereto. The float rod 61 is detachably connected in a screw threaded socket 62 of a right angled rigid extension 63 which is located in right angled relation with respect to the axis of float rod 61. This member 63 is illustrated in FIGURE 5 and consists of the lower base part 64 into which the float rod 61 is screw threaded, and spaced flanges 66 and 67. This bifurcated arrangement enables the inner end of the valve stem 41 to be placed into the space between the flanges 66 and 67, wherein it is pivoted by means of a pivot pin designated at 68. The pivot pin 68 is located in spaced relation with respect to the axis of the float rod 61. A link 70, best shown in FIGURE 6, is preferably pivoted at 71 to a lug 72 formed integral with the cylinder 11 of the valve body 10, and the link 70 at its opposite end is pivoted by a pin 73 to the upper end of the float assembly part 63 spaced from the pivot pin 68.

In one particular illustration, for fluid control, intended to handle oil and water under superatmospheric pressure, the float sphere 60 is weighted to sink in oil but to float upon water. Therefore, it operates at the interface 85 between the oil and water. If conditions are present in the tank B where the interface 85 is at a desired level, the float mechanism will hold the valve disc 47 against the valve seat flange 32 and thus close off admission of water to the chamber 16. It should be noted that the pipe line 36ª in the present application upon the tank is connected by a coupling means 90 upon the tank B below the valve so that water under pressure will flow through the line 36ª and into the chamber 16 when the water level or interface between the oil and water rises, as shown in FIGURE 3. This will enable the water to flow into the chamber 16 and pass through the outlet line 91 for operating a master valve or for release under any other situation desired.

Bearing in mind that high superatmospheric pressures are maintained in the tank B, in order that the valve will operate as above described it is necessary that pressure equalization on the valve at its outer end be maintained. This is effectively accomplished, since the water which passes through the line 36ª is under superatmospheric pressure and bears against the valve disc 44, thus equalizing the attempt of the pressure within the tank B to close the valve against the seat.

An important feature of this invention resides in the fact that the orifice 33 is larger than the orifice 95 of the outlet line 91 where the same enters the chamber 16. This difference in size is necessary in order to prevent lowering of the pressure in chamber 16 and pressure balance on both sides of the valve assembly. It should also be noted that the valve head surface facing the valve seat has an area greater than the cross sectional area of the inlet orifice 33.

The improved valve of this invention may be used in an upside-down position from that shown in FIGURES 2 and 3 to serve the purpose of controlling different fluids in the tank or to serve the condition that the valve will remain open until the valve float is raised, and this will then close the valve.

There will be no back pressure problem of fluid in line 91, because the master valve which is activated by the water released through the line 91 is present to operate at a pressure less than that within the tank B.

Various changes in the size, shape and arrangement of parts may be made to the form of invention herein shown and described, without departing from the spirit of the invention or scope of the claims.

I claim:

1. In combination with a receptacle having a chamber therein receiving a fluid under atmospheric pressure, a base member secured to said receptacle extending into the chamber of the receptacle and having a passageway therethrough, a hollow cap detachably secured in sealed relation upon said base member having a chamber therein into which the passageway of the base member opens, a valve stem slidable in the passageway of the base member having an end projecting into the chamber of the tank and having an opposite end provided with a valve head disposed in the chamber of said hollow cap, said valve stem being slidable in the passageway of the base member in sealed relation therein, a valve seat mounted upon said hollow cap having a passageway therethrough with an orifice opening into the chamber of said cap, a pipe line connected with the hollow cap having a passageway therethrough opening at one end into said valve seat passageway and opening at its other end into said tank chamber, said cap having an outlet line connected therewith provided with a passageway therein opening into an orifice in the cap communicating with the chamber in said cap, the area of the valve head facing the valve seat being greater than the cross sectional area of the orifice of the valve seat opening into said cap chamber and the cross sectional area of the orifice of the valve seat opening into said cap chamber being greater than the cross sectional area of the outlet line orifice opening into said cap chamber, and float means pivotally mounted upon said base within the tank chamber having a connection with said valve stem for reciprocating the latter as the liquid rises and falls within the tank chamber.

2. The mechanism described in claim 1 in which the float mechanism pivoted to said base comprises a float having a rod connected thereto and extending therefrom, said rod remote from the float having a rigidly connected lateral extension, said extension being pivoted intermediate its ends to the end of the stem projecting within the tank chamber, a link pivotally connected upon said lateral extension at the opposite side of the stem pivot with respect to said float rod, said link at its end remote from its pivotal connection with said lateral extension being pivotally connected to the base.

3. In combination with a receptacle having a chamber therein receiving a fluid therein under pressure, a valve supporting body having a chamber therein, a valve seat mounted upon said body having an orifice therein to said body chamber, an inlet line connected to and between the valve body and receptacle for admitting a fluid from the receptacle chamber into said valve body chamber through said valve seat orifice, discharge means connected with said body having an orifice communicating with the chamber therein for discharging the fluid from said receptacle chamber, a valve member movably mounted upon said body having a valve head thereon disposed in said valve body chamber for operating against said valve seat to stop flow of fluid through said inlet line into said body chamber, said valve member having an end extending externally of said body into the receptacle chamber, and float means mounted in the receptacle chamber operatively connected to said valve end for actuating said valve member, the cross sectional area of the inlet orifice of the valve seat being greater than the cross sectional area of the orifice of the fluid discharge means at its point of opening to said valve body chamber.

4. In combination with a receptacle having a chamber therein receiving a fluid therein under pressure, a casing structure defining a chamber therein, pipe means connected to said receptacle and to the casing for admission of fluid from the receptacle chamber to the chamber of the casing, a valve seat mounted upon said casing having an orifice connecting with the pipe means for the flow of the fluid from the receptacle chamber through the orifice to said casing chamber, a liquid discharge means having an orifice opening to said casing chamber for outflow of fluid from said casing chamber, a valve seat reciprocably mounted upon said casing having an end extending into said casing chamber and there being provided with a valve head spaced from but adapted to actuate against the valve seat for controlling flow of fluid through the orifice of the valve seat, said valve stem at its opposite end from the valve head extending into the chamber of the receptacle, and float means mounted in the receptacle chamber connected to the valve stem in the receptacle chamber for actuating the stem and valve head, the orifice of the valve seat in cross sectional area at its point of opening to said casing chamber being greater than the cross sectional area of the outflow orifice of said casing chamber.

5. The mechanism as described in claim 4 in which the valve head surface facing the valve seat has an area greater than the cross sectional area of the inlet orifice of the valve seat.

References Cited in the file of this patent

UNITED STATES PATENTS

| | | |
|---|---|---|
| 1,461,885 | Anderson | July 17, 1923 |
| 2,191,700 | Stetson | Feb. 27, 1940 |
| 2,240,560 | King | May 6, 1941 |
| 2,701,620 | Crawford | Feb. 8, 1955 |
| 2,955,611 | Shimizu | Oct. 11, 1960 |

UNITED STATES PATENT OFFICE
CERTIFICATE OF CORRECTION

Patent No. 3,073,337

January 15, 1963

Russell D. May

It is hereby certified that error appears in the above numbered patent requiring correction and that the said Letters Patent should read as corrected below.

Column 4, line 43, for "seat" read -- stem --.

Signed and sealed this 6th day of August 1963.

(SEAL)
Attest:

ERNEST W. SWIDER
Attesting Officer

DAVID L. LADD
Commissioner of Patents